(No Model.)
N. BENARDOS.
METHOD OF WORKING METALS BY ELECTRICITY.
No. 388,245. Patented Aug. 21, 1888.
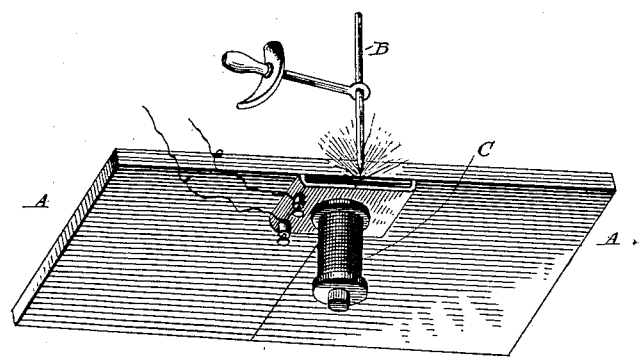
WITNESSES,
Edwin T. Yewell.
INVENTOR.
Nicholas Benardos
by Marcellus Bailey,
Attorney.

UNITED STATES PATENT OFFICE.

NICHLAS BENARDOS, OF ST. PETERSBURG, RUSSIA.

METHOD OF WORKING METALS BY ELECTRICITY.

SPECIFICATION forming part of Letters Patent No. 388,245, dated August 21, 1888.

Application filed June 6, 1888. Serial No. 276,279. (No model.)

*To all whom it may concern:*

Be it known that I, NICHLAS BENARDOS, of St. Petersburg, in the Empire of Russia, have invented a new and useful Improvement in Working Metals by Electricity, of which the following is a specification.

My present invention is an improvement on the process of welding or working metals by means of the electric arc set forth in United States Letters Patent No. 363,320, of May 17, 1887; and its object is to obtain increased efficiency of action of the electric arc on the metal to be worked or melted and to render more perfect the welded joint made in welding metals by the said patented process. This object I attain by the application to the metal at the point where it is being welded or worked of an electro magnet, which I have ascertained influences not only the electric arc, but also the molten metal itself. The effect of the electro-magnetic action thus exerted is to cause the arc to act in a steady concentrated manner without disturbance or interruption, causing the metal to be acted on and melted more energetically, rapidly, and evenly, and at the same time enabling the workman to manage the same more perfectly. So far as its effect upon the metal itself is concerned, the weld is smoother and without the porous portions which sometimes have hitherto been found, and shows a more perfect and uniform joining of the parts.

The nature of my invention and the manner in which the same is or may be carried into effect will be understood by reference to the accompanying drawing, which represents the welding together of two plates in accordance with my improvement.

A A are the two plates to be joined together, and B is the carbon, the arc by which the metal is worked being formed between the two, with the carbon as the positive and the metal as the negative pole, all as described in the Letters Patent hereinbefore named. The electro-magnetic force exerted on the joint at the point where the welding takes place is obtained from a powerful electro-magnet, C, applied to that face of the plates opposite to the one on which the arc is formed and at a point opposite to that portion of the joint which is being worked or formed by the arc. During the progress of the work the electro-magnet should be moved with reference to the plates, or vice versa, so that the arc shall be maintained in the field of the electro-magnet. The effect of this action has been hereinbefore stated, and need not be repeated. As an incidental advantage, it may also be noted that when forming a joint upon the under side or face of the metal the electro-magnetic attractive force applied from above will measurably act to restrain the flowing away of the metal, (if the latter be paramagnetic.)

My invention can be applied in a large variety of ways and with many forms of apparatus. In another application for Letters Patent, of even date herewith, Serial No. 276,280, I have described one form of apparatus in which the core of the electro-magnet constitutes the anvil upon which the work rests, or in which the work itself may form part of the electro-magnet. I limit myself to none of these special things; but

What I claim herein as new, and desire to secure by Letters Patent, is—

In the hereinbefore-described process of welding or working metals by means of the electric arc, the method of improving the metal and enhancing the efficiency of the arc, which consists in subjecting the same to the influence of an electro-magnet, in the field of which the arc is maintained during the welding operation, substantially as and for the purposes hereinbefore set forth.

In testimony whereof I have hereunto set my hand this 11th day of April, A. D. 1888.

NICHLAS BENARDOS.

Witnesses:
N. TSCHEKALOFF,
JAMES FRESHVILLE.